UNITED STATES PATENT OFFICE.

YASUTARO TAKESHIMA, OF TOKYO, JAPAN.

PROCESS OF MANUFACTURING ALUMINIUM OXID FROM ALUMINIUM SILICATE OR A SUBSTANCE CONTAINING ALUMINIUM SILICATE AND OBTAINING SODIUM CARBONATE AS A BY-PRODUCT.

1,277,503.     Specification of Letters Patent.     Patented Sept. 3, 1918.

No Drawing.     Application filed October 23, 1917. Serial No. 198,086.

*To all whom it may concern:*

Be it known that I, YASUTARO TAKESHIMA, subject of the Emperor of Japan, residing at No. 31 Oiwake Cho, Hongo Ku, Tokyo, Japan, have invented new and useful improvements in processes of manufacturing aluminium oxid from aluminium silicate or a substance containing aluminium silicate and obtaining sodium carbonate as a by-product, of which the following is a specification.

This invention relates to process of manufacturing aluminium oxid, at the same time obtaining as a by-product sodium carbonate, and consists in first mixing aluminium silicate or a substance containing aluminium silicate with calcium carbonate, sodium sulfate and carbon, and steeping the mixture in water, either cold or hot, after roasting the same. The sediments which consist of calcium silicate and calcium sulfid are then removed, and carbon dioxid gas is blown into the fluid which is a solution of sodium aluminate, thus separating therefrom aluminium hydroxid, and at the same time obtaining sodium carbonate in aqueous solution. The object of this invention is to produce economically and by simple means aluminium oxid, using inexpensive sodium sulfate, and at the same time to obtain as a by-product sodium carbonate.

I am aware that there is a process of producing sodium carbonate well-known as the Leblanc process, in which sodium sulfate is fluxed with calcium carbonate and carbon. The present process, however, of producing as the principal product aluminium oxid and as a by-product sodium carbonate by roasting a mixture of aluminium silicate, sodium sulfate, calcium carbonate and carbon is not only hitherto not known, but the working order of this latter process is different from that of the former. According to the present process sodium aluminate is first produced, and then by blowing carbon dioxid thereinto aluminium hydroxid is separated and at the same time sodium carbonate is produced as a by-product. Moreover, the molecular proportions used in this present process is different from those used in the Leblanc process. In the Leblanc process, the theoretical molecular proportion of sodium sulfate and calcium carbonate is 1 molecule of the former to 1 molecule of the latter. Now in the present process 2 molecules of calcium carbonate to 1 molecule of silicon oxid contained in the aluminium silicate must be added to the above theoretical proportion of the Leblanc process. These proportions must be strictly adhered to, otherwise no good result can be obtained, as will be explained later. As to the proportion of sodium sulfate, 2 molecules thereof to 1 molecule of aluminium hydroxid gives the best result.

In other words, the ingredients used in my process must be taken according to molecular proportions expressed in the following equation:

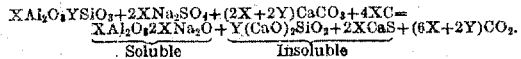
$$X Al_2O_3 Y SiO_2 + 2XNa_2SO_4 + (2X+2Y)CaCO_3 + 4XC = \underbrace{X Al_2O_3 2X Na_2O}_{\text{Soluble}} + \underbrace{Y(CaO)_2 SiO_2 + 2X CaS}_{\text{Insoluble}} + (6X+2Y)CO_2.$$

My invention is carried into effect as follows:

Take a quantity of aluminium silicate and respective quantities of calcium carbonate, sodium sulfate and carbon according to the before mentioned equation, but carbon somewhat in excess, and mix them well after carefully pulverizing them. If the quantity of calcium carbonate is in excess, not only is a higher temperature required in roasting the mixture, but the production of aluminium oxid is decreased. On the other hand if it is short of the required quantity, insoluble double salts of complex construction are formed among silicates of aluminium, calcium and sodium, which decreases the production of aluminium oxid and sodium carbonate. Thus great care must be taken to use exactly the required amonut of each ingredient. However, a small excess of carbon over the theoretical quantity, will accelerate the reaction while roasting. Then grind the mixture adding a suitable quantity of water thereto into consistent paste and shape it into any convenient form, and after drying roast the same in an oven, thus causing the chemical actions to complete. After cooling, steep the roasted mixture in water which may be either cold or hot, and remove the dregs by allowing them to settle or by means of a filter. Blow in carbon dioxid gas to the fluid thus obtained which is a solution of sodium aluminate, for which purpose the gas produced in the oven may be utilized after clarifying it.

The aluminium hydroxid thus separated and extracted from the sodium aluminate fluid saturated with carbon dioxid, is carefully washed with warm water and the sodium carbonate attaching thereto removed. The aluminium hydroxid thus freed of impurities is roasted and pure aluminium oxid is obtained. The remaining fluid consists of a solution of sodium carbonate, from which the sodium carbonate is recovered by first evaporating the fluid to a certain degree and allowing it to crystallize. The sodium sulfid which exists more or less in the sodium aluminate fluid, is decomposed when carbon dioxid is passed into the fluid and hydrogen sulfid escapes leaving sodium carbonate behind.

This process is best suited to the manufacture of aluminium oxid from aluminium silicate, such as kaolin, fire-clay or a kind of bauxite which is comparatively rich in silicon compounds. The sodium sulfate used in this process can be obtained very cheaply, being abundantly produced in the manufacture of nitric acid from sodium nitrate (Chile niter), and the price of sodium carbonate obtained as a by-product is sufficient to pay all the expenses required for producing aluminium oxid. Thus this process is very economical.

Having thus described my invention, what I claim as new and desire to secure by Letters Patent is:

The process of producing aluminium oxid and obtaining as a by-product sodium carbonate, which consists in mixing aluminium silicate, calcium carbonate, sodium sulfate and carbon, especially in the molecular proportions expressed in the equation

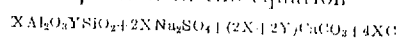

or in proportions nearest thereto, steeping the mixture in water after roasting the same, and extracting from the fluid thus obtained aluminium oxid, at the same time obtaining sodium carbonate, by passing into the fluid carbon dioxid gas, substantially as hereinbefore described.

In testimony whereof I have signed my name to this specification in the presence of two subscribing witnesses.

YASUTARO TAKESHIMA.

Witnesses:
 YOSHIKA IKEDA,
 H. F. HAWLEY.